(12) United States Patent
Takaoka

(10) Patent No.: US 9,547,310 B2
(45) Date of Patent: Jan. 17, 2017

(54) MOBILE OBJECT CONTROL SYSTEM, MOBILE OBJECT CONTROL METHOD AND NON-TRANSITORY RECORDING MEDIUM

(71) Applicant: TOYOTA JIDOSHA KABUSHIKI KAISHA, Toyota-shi (JP)

(72) Inventor: Yutaka Takaoka, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/626,100

(22) Filed: Feb. 19, 2015

(65) Prior Publication Data

US 2015/0239125 A1    Aug. 27, 2015

(30) Foreign Application Priority Data

Feb. 21, 2014    (JP) ................. 2014-031863

(51) Int. Cl.
G05B 19/04    (2006.01)
G05B 19/18    (2006.01)
G05D 1/02    (2006.01)

(52) U.S. Cl.
CPC .......... *G05D 1/0274* (2013.01); *G05D 1/0242* (2013.01); *Y10S 901/01* (2013.01); *Y10S 901/47* (2013.01)

(58) Field of Classification Search
CPC ... G05D 1/0242; G05D 1/0274; Y10S 901/01; Y10S 901/47; B25J 9/16; B25J 9/167

(Continued)

(56) References Cited

U.S. PATENT DOCUMENTS 7,873,437 B2 * 1/2011 Aldred ................. G05D 1/0227
700/245
2004/0255425 A1 * 12/2004 Arai ......................... A47L 5/28
15/300.1

(Continued)

FOREIGN PATENT DOCUMENTS

JP    7-103696 A    4/1995
JP    2003-136456    5/2003

(Continued)

*Primary Examiner* — Jerrah Edwards
*Assistant Examiner* — Rachid Bendidi
(74) *Attorney, Agent, or Firm* — Oblon, McClelland, Maier & Neustadt, L.L.P.

(57) ABSTRACT

A mobile object control system includes a mobile object body, a distance measurement unit provided in the mobile object body to measure a distance between the mobile object body and an object present in front of the mobile object body with infrared rays, a movement control unit controlling the movement of the mobile object body based on a measurement result obtained by the distance measurement unit and moving path information, a moving direction limit information storage unit storing moving direction limit information as information on limiting a moving direction of the mobile object body, and a moving path information generation unit generating the moving path information based on the moving direction limit information. The moving direction limit information is information on limiting the moving direction in which a predetermined amount or more of infrared rays emitted from an external light source are radiated onto the mobile object body.

7 Claims, 15 Drawing Sheets

(58) Field of Classification Search
 USPC ........................................ 700/253; 901/1, 47
 See application file for complete search history.

(56) References Cited

U.S. PATENT DOCUMENTS

2007/0050086 A1\* 3/2007 Lim ..................... G05D 1/0225
                                                  700/245
2013/0116880 A1\* 5/2013 Shitamoto .............. G05D 1/024
                                                  701/25

FOREIGN PATENT DOCUMENTS

JP    2004-21774    1/2004
JP    2009-56530    3/2009

\* cited by examiner

MOBILE OBJECT CONTROL SYSTEM, MOBILE OBJECT CONTROL METHOD AND NON-TRANSITORY RECORDING MEDIUM

INCORPORATION BY REFERENCE

The disclosure of Japanese Patent Application No. 2014-031863 filed on Feb. 21, 2014 including the specification, drawings and abstract is incorporated herein by reference in its entirety.

BACKGROUND OF THE INVENTION

1. Field of the Invention

The invention relates to a mobile object control system, a mobile object control method, and a non-transitory recording medium.

2. Description of Related Art

As this kind of art, Japanese Patent Application Publication No. 2004-21774 (JP-2004-21774 A) discloses a mobile working robot that moves while measuring the distance between a host machine and an obstacle through the use of infrared rays. In some cases, this mobile working robot cannot accurately measure the distance between the host machine and the obstacle due to the influence of infrared rays emitted from an external light source. Thus, in Japanese Patent Application Publication No. 2004-21774 (JP-2004-21774 A), the mobile working robot is provided with illuminance measurement means for measuring the illuminance around the host machine. Then, the moving direction and running speed of the host machine are changed, or the host machine is stopped, in accordance with a measurement result of the illuminance around the host machine.

However, with the configuration of the aforementioned Japanese Patent Application Publication No. 2004-21774 (JP-2004-21774 A), the technical significance of the act of changing the moving direction and running speed of the host machine or stopping the host machine in accordance with the measurement result of the illuminance around the host machine is unclear.

SUMMARY OF THE INVENTION

The invention provides a mobile object control system, a mobile object control method, and a non-transitory recording medium that allow a mobile object to reach its destination without any problem even under an environment where infrared rays from an external light source are radiated.

A first aspect of the invention of the present application relates to a mobile object control system. The mobile object control system includes a mobile object body, a distance measurement unit that is provided in the mobile object body to measure a distance between the mobile object body and an object present in front of the mobile object body through a use of infrared rays, a movement control unit configured to control movement of the mobile object body based on a measurement result obtained by the distance measurement unit and moving path information on a moving path of the mobile object body, a moving direction limit information storage unit configured to store moving direction limit information as information on limiting a moving direction of the mobile object body, and a moving path information generation unit configured to generate the moving path information based on the moving direction limit information. The moving direction limit information is information on limiting the moving direction of the mobile object body in which a predetermined amount or more of infrared rays emitted from an external light source are radiated onto the mobile object body from ahead of the mobile object body.

According to the foregoing aspect of the invention, the mobile object body can reach its destination without any problem even under an environment where the infrared rays from the external light source are radiated.

In the aforementioned aspect of the invention, the moving direction limit information may be information on limiting the moving direction of the mobile object body that coincides with at least an opposite direction of a propagation direction of the infrared rays emitted from the external light source.

In the aforementioned aspect of the invention, the moving direction limit information storage unit may store a plurality of pieces of moving direction limit information that differ depending on a clock time, and the moving path information generation unit may select the moving direction limit information corresponding to a current clock time from the plurality of the pieces of moving direction limit information, and generate the moving path information based on the selected moving direction limit information.

According to the foregoing aspect of the invention, the mobile object body can reach its destination without any problem even in the case where the propagation direction of the infrared rays emitted from the external light source changes with time.

A second aspect of the invention of the present application relates to a control method for a mobile object that moves while measuring a distance between a mobile object body and an object present in front of the mobile object body through a use of infrared rays. The control method for the mobile object includes generating moving path information on a moving path of the mobile object based on moving direction limit information as information on limiting a moving direction of the mobile object, and controlling movement of the mobile object based on the moving path information and a measurement result of the distance. The moving direction limit information is information on limiting the moving direction of the mobile object in which a predetermined amount or more of infrared rays emitted from an external light source are radiated from ahead of the mobile object body.

In the aforementioned aspect of the invention, the moving direction limit information may be information on limiting the moving direction of the mobile object that coincides with at least an opposite direction of a propagation direction of the infrared rays emitted from the external light source.

In the aforementioned aspect of the invention, generating the moving path information may include selecting the moving direction limit information corresponding to a current clock time from a plurality of pieces of moving direction limit information that differ depending on a clock time, and generating the moving path information based on the selected moving direction limit information.

A third aspect of the invention relates to a non-transitory recording medium in which a mobile object control program is recorded. In the non-transitory recording medium, the mobile object control program for causing a computer to execute the mobile object control method according to the aforementioned second aspect of the invention is recorded.

According to the first to third aspects of the invention, the mobile object body can reach its destination without any problem even under an environment where the infrared rays from the external light source are radiated.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

A service robot 1 (a mobile object and a mobile object control system) will be described hereinafter with reference to FIGS. 1 to 15.

Figure 1:
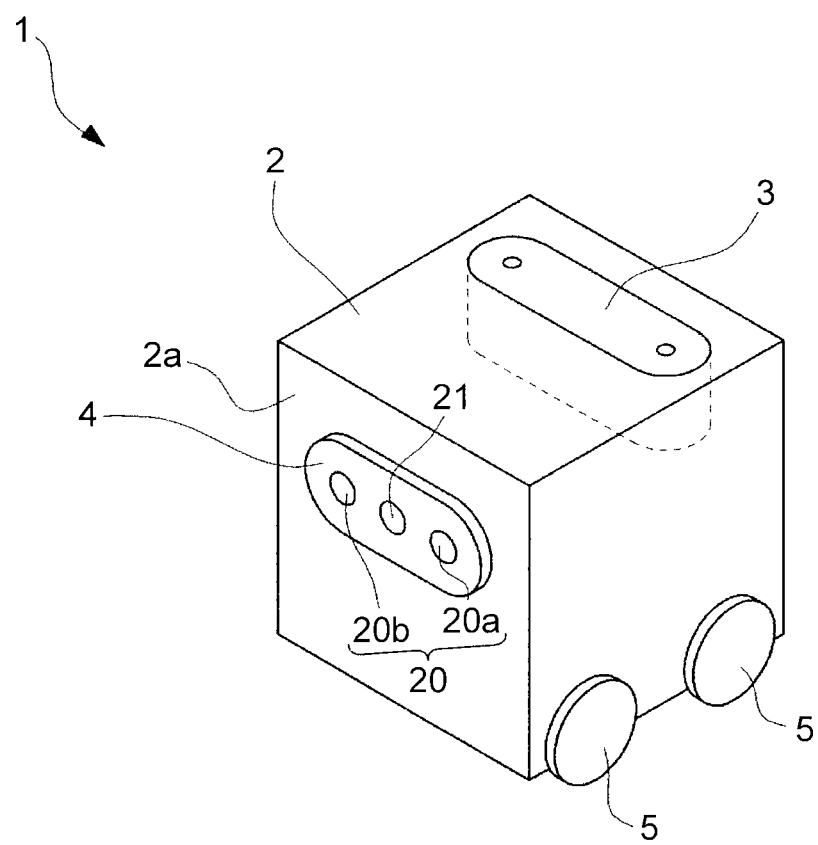
FIG. 1 is a perspective view of a mobile object according to the embodiment of the invention.

The service robot 1 shown in FIG. 1 is a robot that automatically generates a moving path for reaching its destination when the destination is set by being input from the outside, and that runs based on the generated moving path. While running, the service robot 1 measures a distance to an obstacle (an object) in front, and constantly monitors a measurement result, so as not to collide with an obstacle such as a human being, a piece of baggage or the like.

Figure 2:
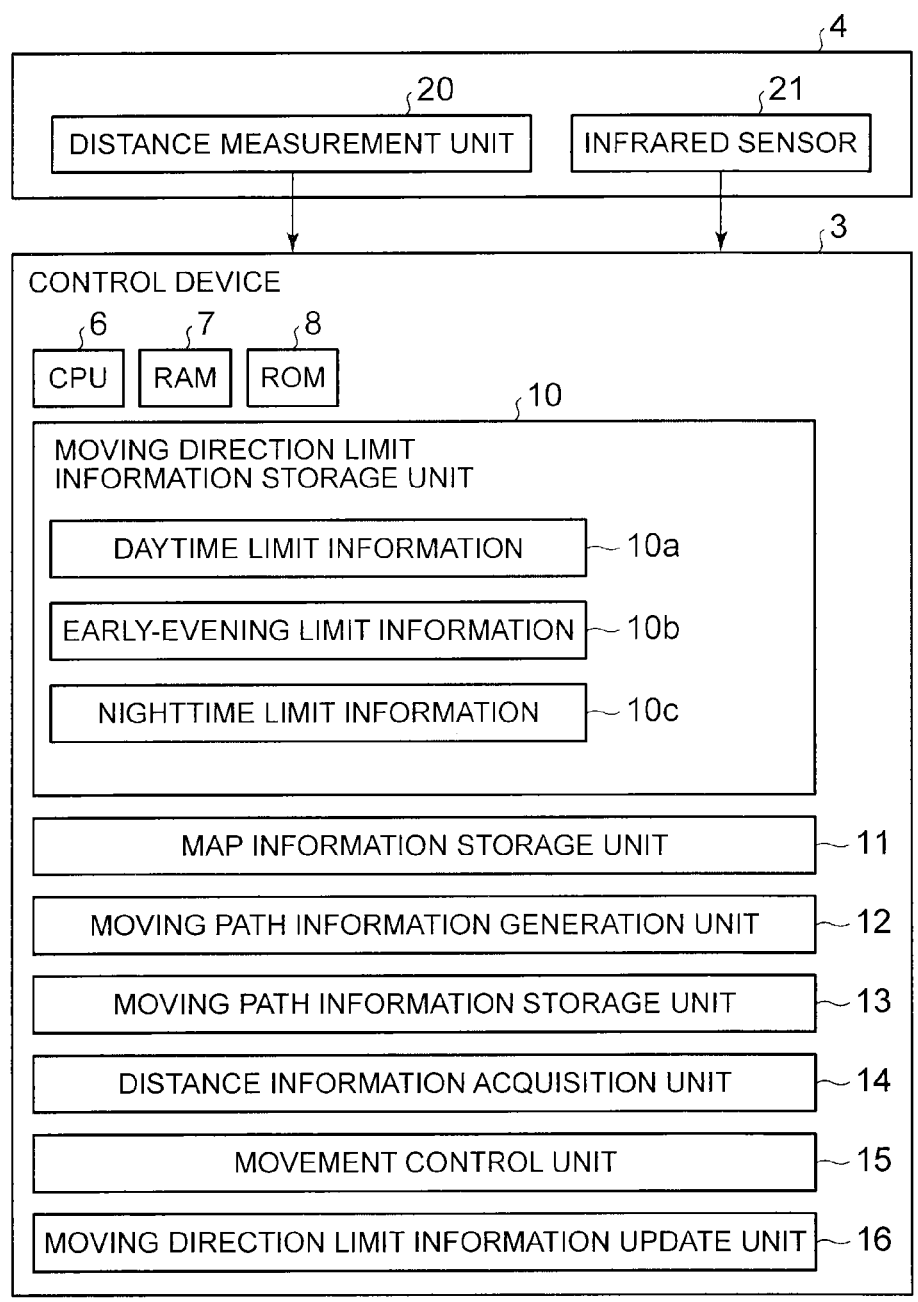
FIG. 2 is a functional block diagram of the mobile object according to the embodiment of the invention.

As shown in FIGS. 1 and 2, this service robot 1 is equipped with a robot body 2 (a mobile object body), a control unit 3 (control means), a sensor unit 4, and four wheels 5.

As shown in FIG. 2, the control unit 3 is equipped with a central processing unit (a CPU) 6, a readable/writable random access memory (a RAM) 7, and a read only memory (a ROM) 8. Then, the CPU 6 reads out and executes a mobile object control program stored in the ROM 8, so the mobile object control program causes a piece of hardware such as the CPU 6 or the like to function as a moving direction limit information storage unit 10 (moving direction limit information storage means), a map information storage unit 11 (map information storage means), a moving path information generation unit 12 (moving path information generation means), a moving path information storage unit 13 (moving path information storage means), a distance information acquisition unit 14 (distance information acquisition means), a movement control unit 15 (moving control means), and a moving direction limit information update unit 16 (moving direction limit information update means).

The sensor unit 4 has a distance measurement unit 20 (distance measurement means) and an infrared sensor 21 (external light level detection means). As shown in FIG. 1, the sensor unit 4 is attached to a front face 2a of the robot body 2 in a moving direction thereof.

The distance measurement unit 20 measures a distance between the robot body 2 and an object present in front of the robot body 2 in the moving direction thereof. The object is, for example, a wall, a human being, or a piece of baggage. As shown in FIG. 1, the distance measurement unit 20 is constituted of an infrared transmission unit 20a and an infrared reception unit 20b. The distance measurement unit 20 emits infrared rays forward of the robot body 2 in the moving direction through the use of the infrared transmission unit 20a. The infrared rays are reflected by the object. The distance measurement unit 20 detects the reflected infrared rays through the use of the infrared reception unit 20b. Thus, the distance measurement unit 20 measures a distance between the robot body 2 and the object present in front of the robot body 2 in the moving direction thereof, and outputs forward distance information as a measurement result to the control unit 3.

The infrared sensor 21 detects infrared rays emitted from an external light source, for example, the sun or the like and radiated onto the front face 2a of the robot body 2. The infrared sensor 21 detects the infrared rays radiated onto the front face 2a of the robot body 2, and outputs a result of the detection to the control unit 3 as an output value. It should be noted herein that the output value is intensity (a level) of the detected infrared rays.

Figure 5:
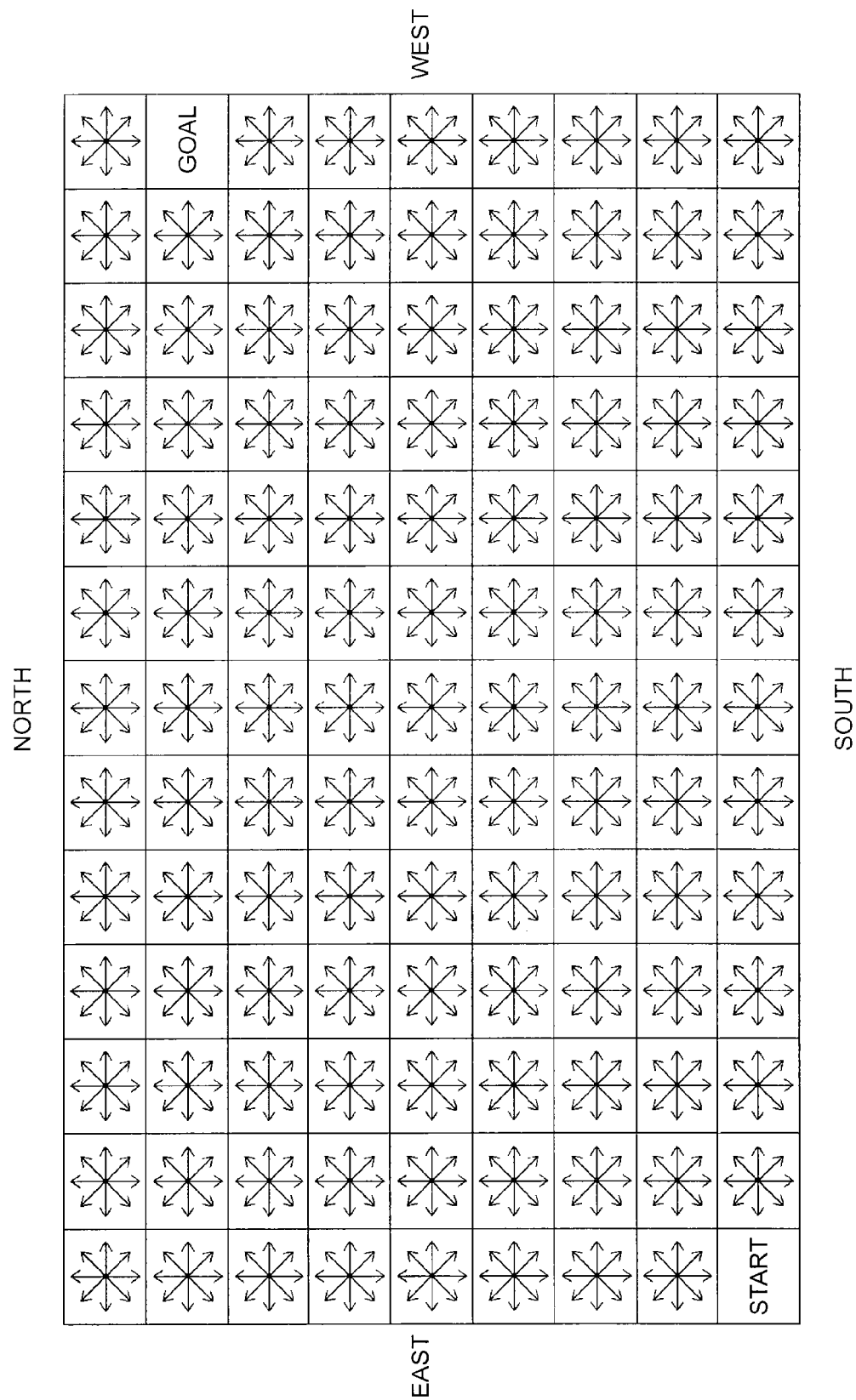
FIG. 5 shows map data on the nighttime service environment according to the embodiment of the invention.
Figure 13:
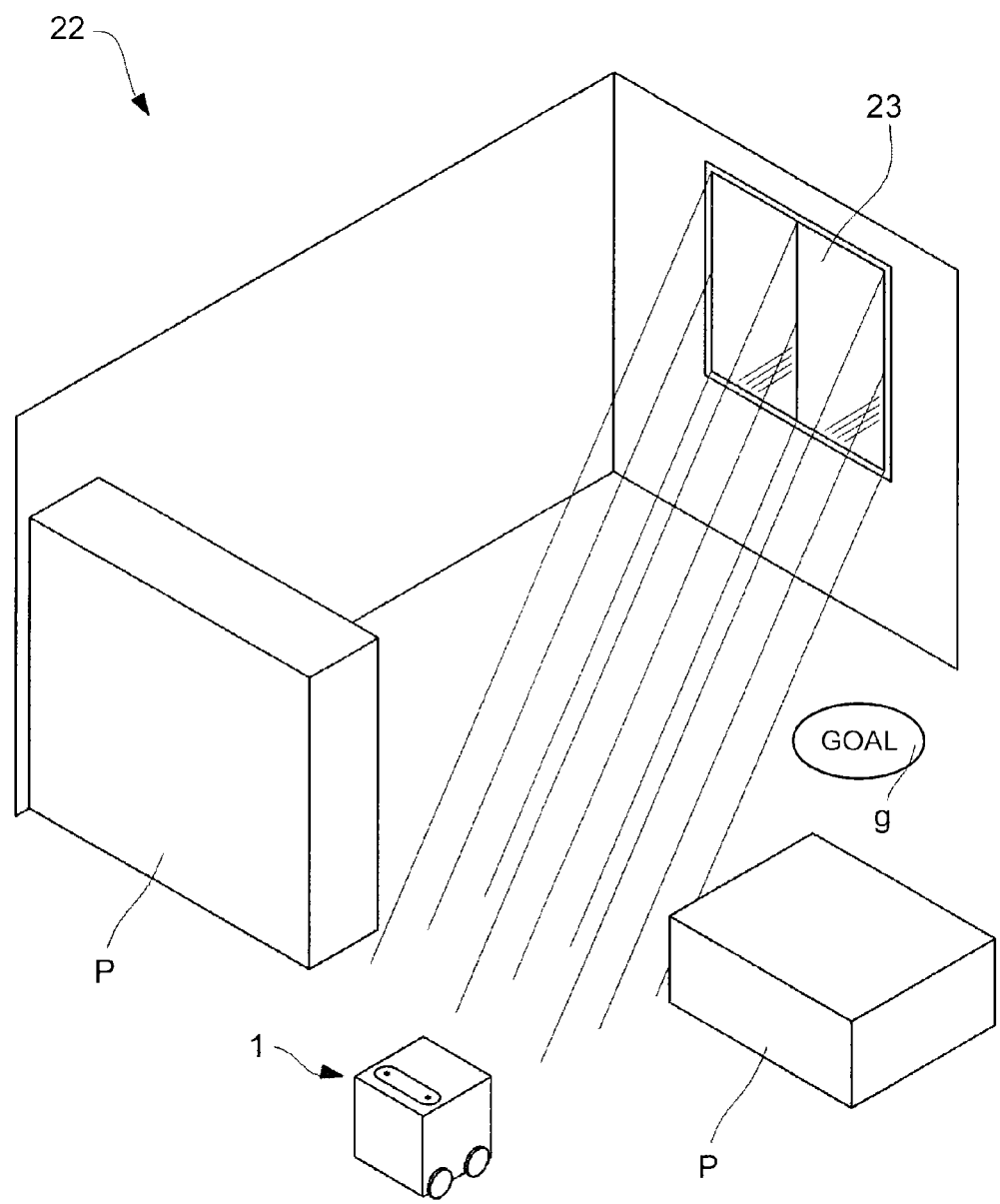
FIG. 13 is a bird's-eye view of the daytime service environment according to the embodiment of the invention.

The map information storage unit 11 stores map information on a service environment. As shown in FIG. 5, the map information is typically expressed by a set of a multitude of cells that are arranged in a lattice pattern. Besides, when there is an obstacle P in the service environment as shown in FIG. 13, the map information includes information meaning that a region corresponding to the obstacle P is inaccessible as hatched in FIG. 14.

Figure 8:
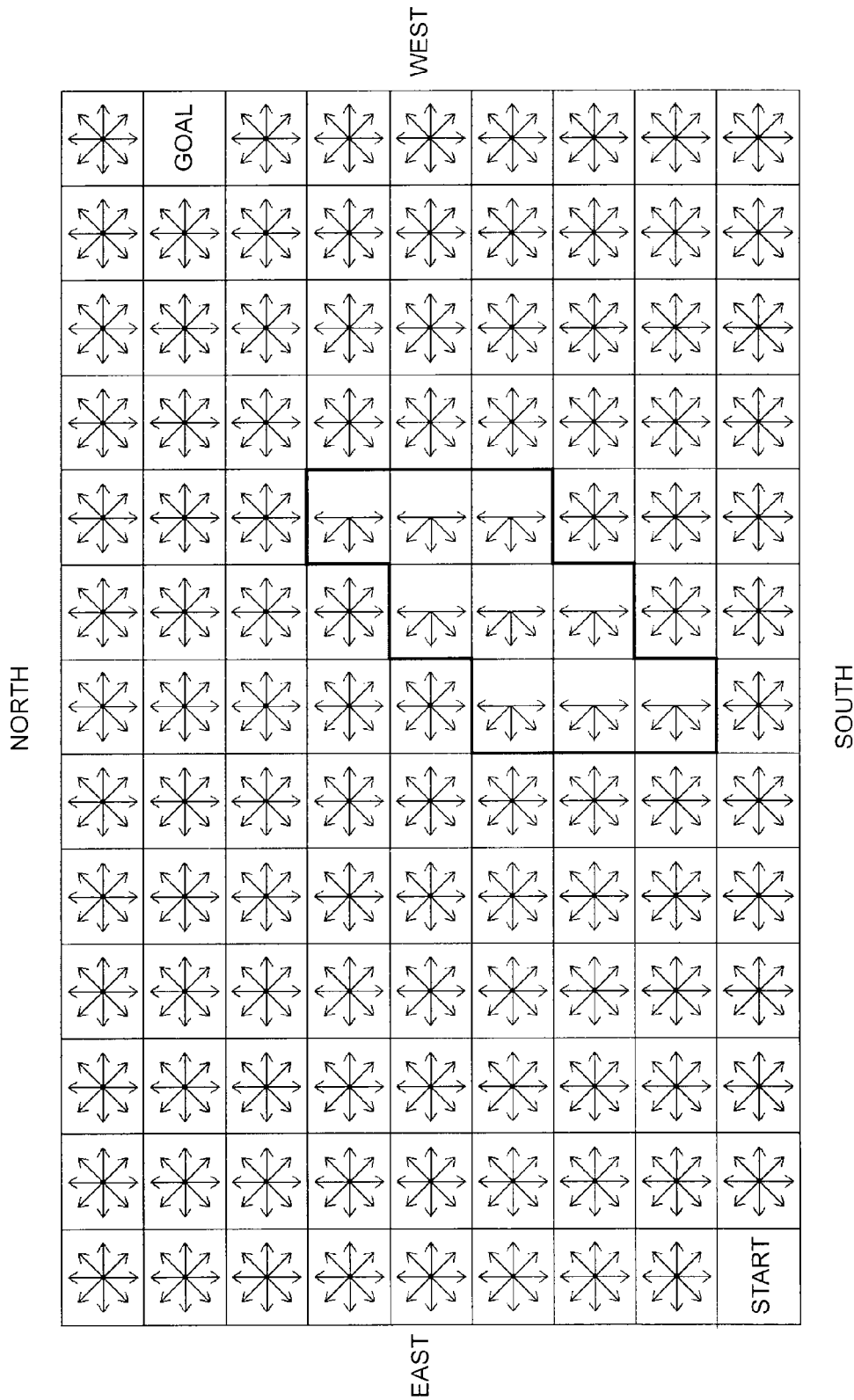
FIG. 8 shows map data on the daytime service environment according to the embodiment of the invention.

The moving direction limit information storage unit 10 stores moving direction limit information as information on limiting the moving direction of the robot body 2. As shown in FIG. 5, the moving direction of the robot body 2" is constituted of, for example, eight moving directions. The eight moving directions are constituted of, for example, east, west, south, north, northeast, northwest, southeast, and southwest. "Limiting the moving direction of the robot body 2" means limiting at least one of the eight moving directions. "Limiting" means that the order of priority of the moving direction is lowered when one of the moving directions is selected, or that the moving direction is prohibited from being selected when one of the moving directions is selected. In the present specification, "limiting" means that the moving direction is prohibited from being selected when one of the moving directions is selected. For example, in FIG. 8, the moving directions that are allowed to be selected as the moving direction of the robot body 2 are indicated by arrows for each of the cells. That is, the moving directions that are prohibited from being selected as the moving direction of the robot body 2 are not denoted by arrows corresponding thereto, for each of the cells. As shown in FIG. 8, the moving direction limit information is information having pieces of information that are independent of one another for each of the cells of the map information in the map information storage unit 11. The moving direction limit information is expressed by arrows depicted respectively for the cells.

The moving direction limit information is information on limiting the moving direction of the robot body 2 in which a predetermined amount (a predetermined level) or more of infrared rays emitted from the external light source are radiated onto the front face 2a of the robot body 2 from ahead of the robot body 2. This is because if a predetermined amount or more of infrared rays emitted from the external light source are radiated onto the infrared reception unit 20b of the distance measurement unit 20, the infrared reception unit 20b of the distance measurement unit 20 cannot correctly detect the infrared rays radiated from the infrared transmission unit 20a.

Besides, as shown in FIG. 2, the moving direction limit information storage unit 10 stores daytime limit information 10a, early-evening limit information 10b, and nighttime limit information 10c as the moving direction limit information. The daytime limit information 10a is the moving direction limit information that is used in the daytime. The early-evening limit information 10b is the moving direction limit information that is used early in the evening. The nighttime limit information 10c is the moving direction limit information that is used in the nighttime. That is, the daytime limit information 10a, the early-evening limit information 10b, and the nighttime limit information 10c are different from one another in the time zone for use. The daytime limit information 10a, the early-evening limit information 10b, and the nighttime limit information 10c are pieces of information that are different from one another.

Figure 4:
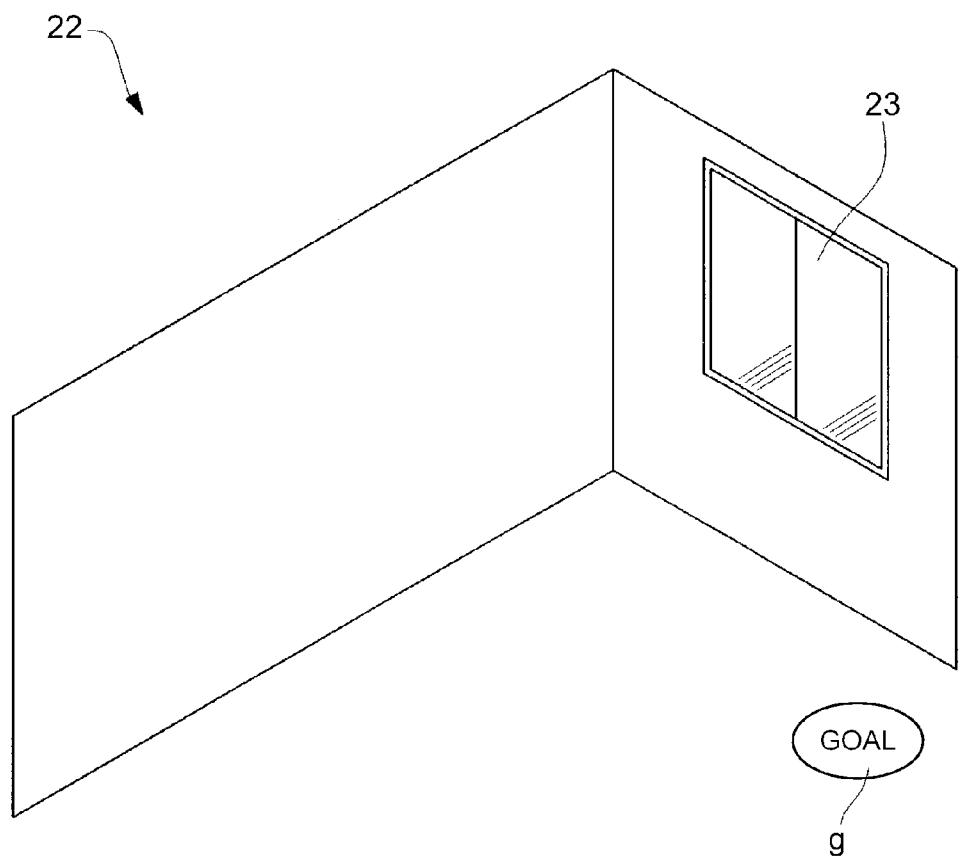
FIG. 4 is a bird's-eye view of a nighttime service environment according to the embodiment of the invention.

A nighttime service environment is depicted in FIG. 4. The service environment shown in FIG. 4 is a room 22. A west wall of the room 22 is provided with a window 23. The destination of the service robot 1 is a goal g near the window 23. A fluorescent light that is attached to a ceiling of the room 22 can be mentioned as the external light source present in the nighttime service environment. The infrared rays radiated from the fluorescent light are weak, and do not adversely affect the operation of the distance measurement unit 20. Accordingly, as shown in FIG. 5, the moving direction of the robot body 2 is not limited in any of the cells.

Figure 7:
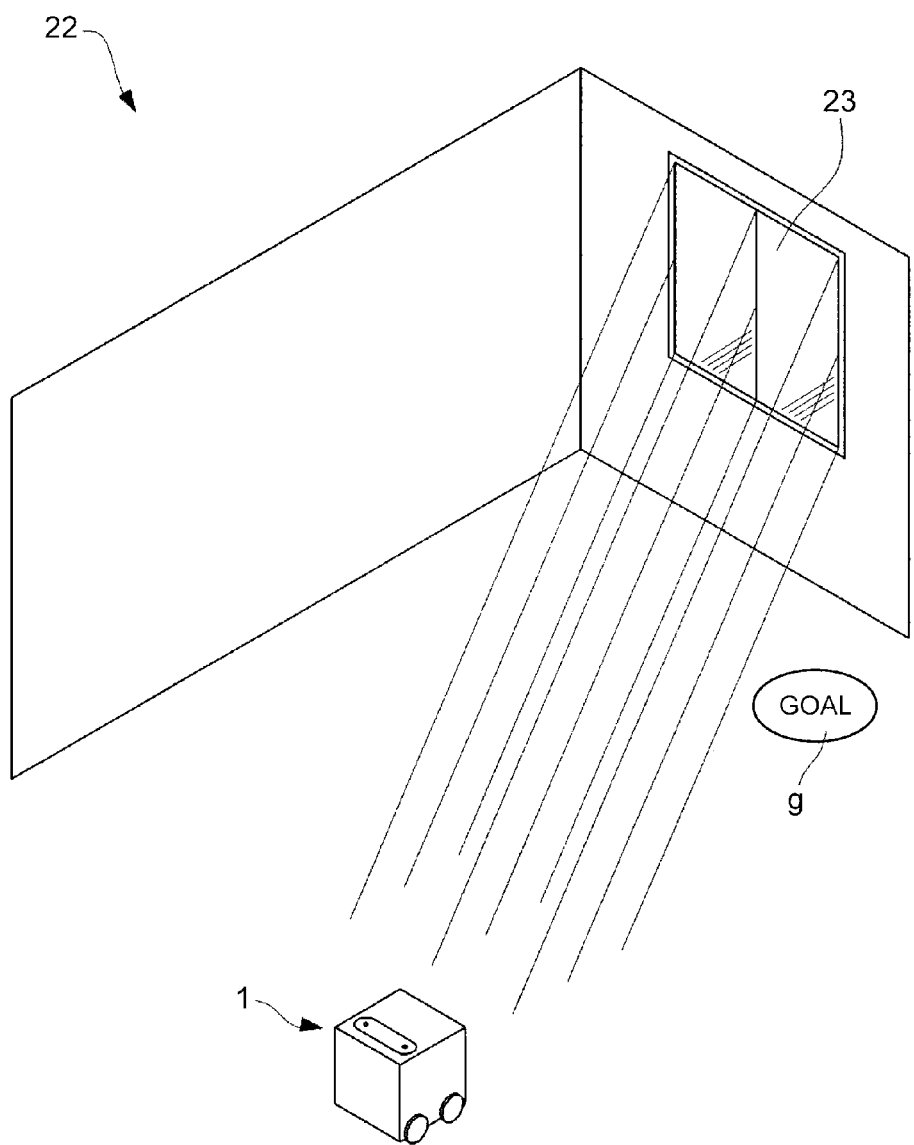
FIG. 7 is a bird's-eye view of a daytime service environment according to the embodiment of the invention.

A daytime service environment is depicted in FIG. 7. In addition to the aforementioned fluorescent light, the sun can be mentioned as the external light source present in the daytime service environment. The infrared rays radiated from the sun are strong. When the front face of the service robot 1 is exposed to the infrared rays emitted from the sun, the operation of the distance measurement unit 20 is adversely affected. Accordingly, as shown in FIG. 8, part of the moving direction of the robot body 2 is locally limited around a region that is irradiated with sunlight. Specifically, as described above, if there is a moving direction of the robot body 2 in which a predetermined amount or more of the infrared rays emitted from the sun are radiated onto the front face 2a of the robot body 2 from ahead of the robot body 2 for each of the cells, the moving direction in each of the cells is limited. In other words, the moving direction of the service robot 1 that substantially coincides with the opposite direction of the propagation direction of the infrared rays emitted from the sun is limited for each of the cells. In the example of FIG. 8, the service robot 1 is prevented from moving southwest, west or northwest in a plurality of cells surrounded by a thick frame.

Figure 10:
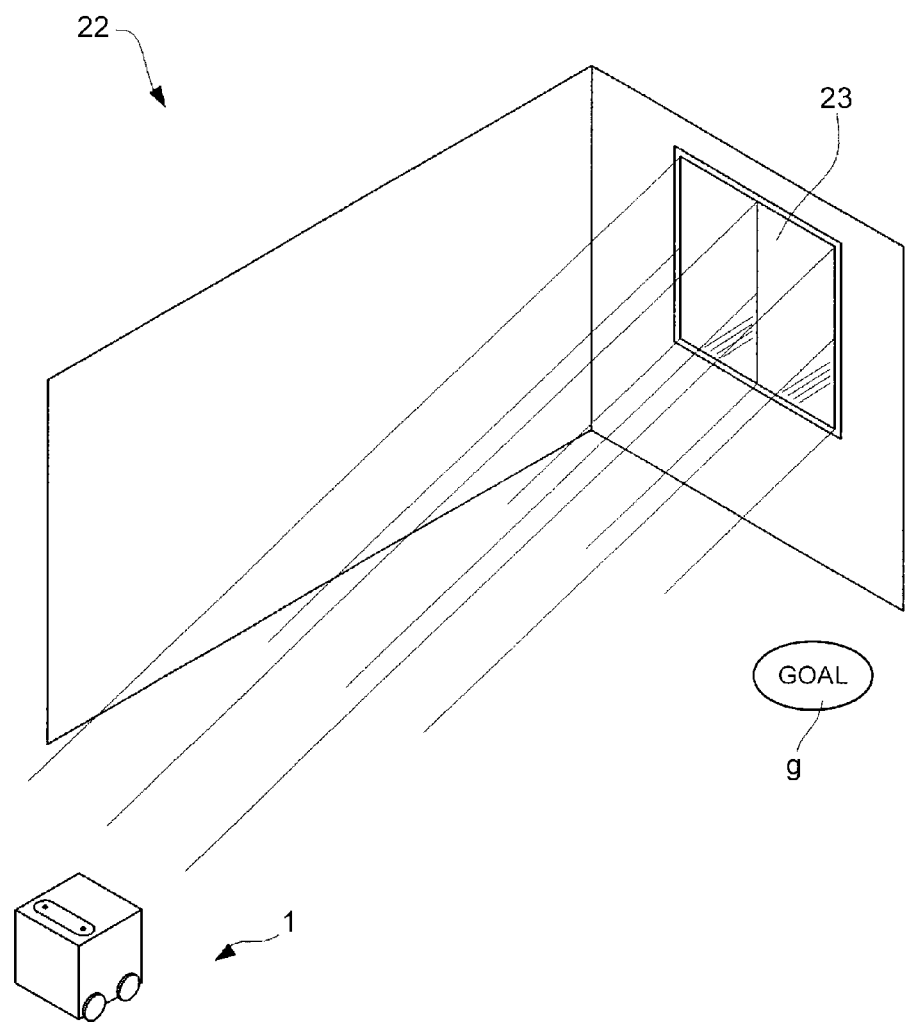
FIG. 10 is a bird's-eye view of an early-evening service environment according to the embodiment of the invention.
Figure 11:
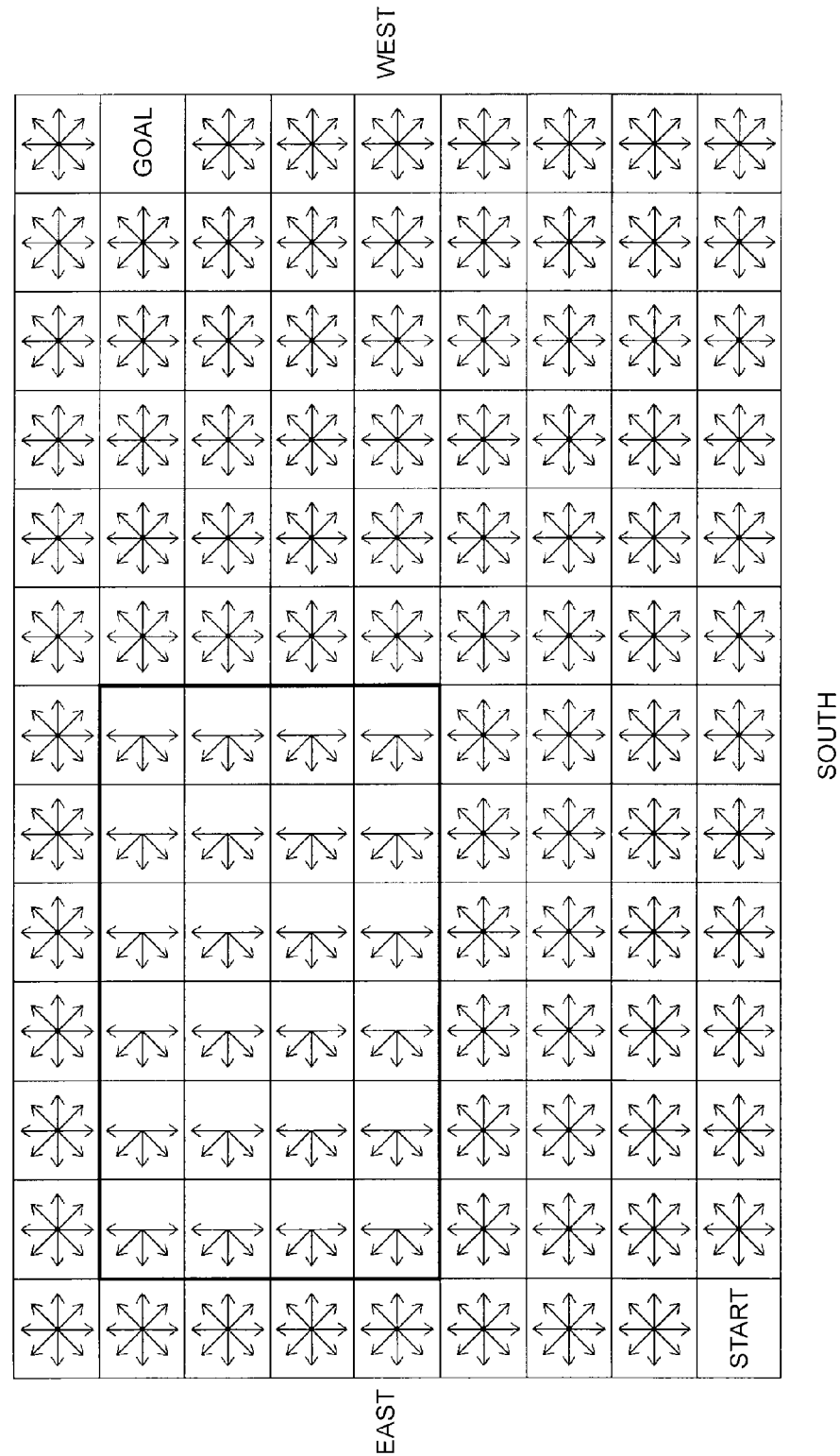
FIG. 11 shows map data on the early-evening service environment according to the embodiment of the invention.

An early-evening service environment is depicted in FIG. 10. In addition to the aforementioned fluorescent light, the sun can be mentioned as the external light source present in the early-evening service environment. The infrared rays emitted from the sun are strong. When the front face of the service robot 1 is exposed to the infrared rays emitted from the sun, the operation of the distance measurement unit 20 is adversely affected. Accordingly, as shown in FIG. 11, part of the moving direction of the robot body 2 is locally limited around a region that is irradiated with sunlight. Specifically, as described above, if there is a moving direction of the robot body 2 in which a predetermined amount or more of the infrared rays emitted from the sun are radiated onto the front face 2a of the robot body 2 from ahead of the robot body 2 for each of the cells, the moving direction in each of the cells is limited. In other words, the moving direction of the service robot 1 that substantially coincides with the opposite direction of the propagation direction of the infrared rays emitted from the sun is limited for each of the cells. In the example of FIG. 11, the service robot 1 is prevented from moving southwest, west or northwest in a plurality of cells surrounded by a thick frame.

Figure 14:
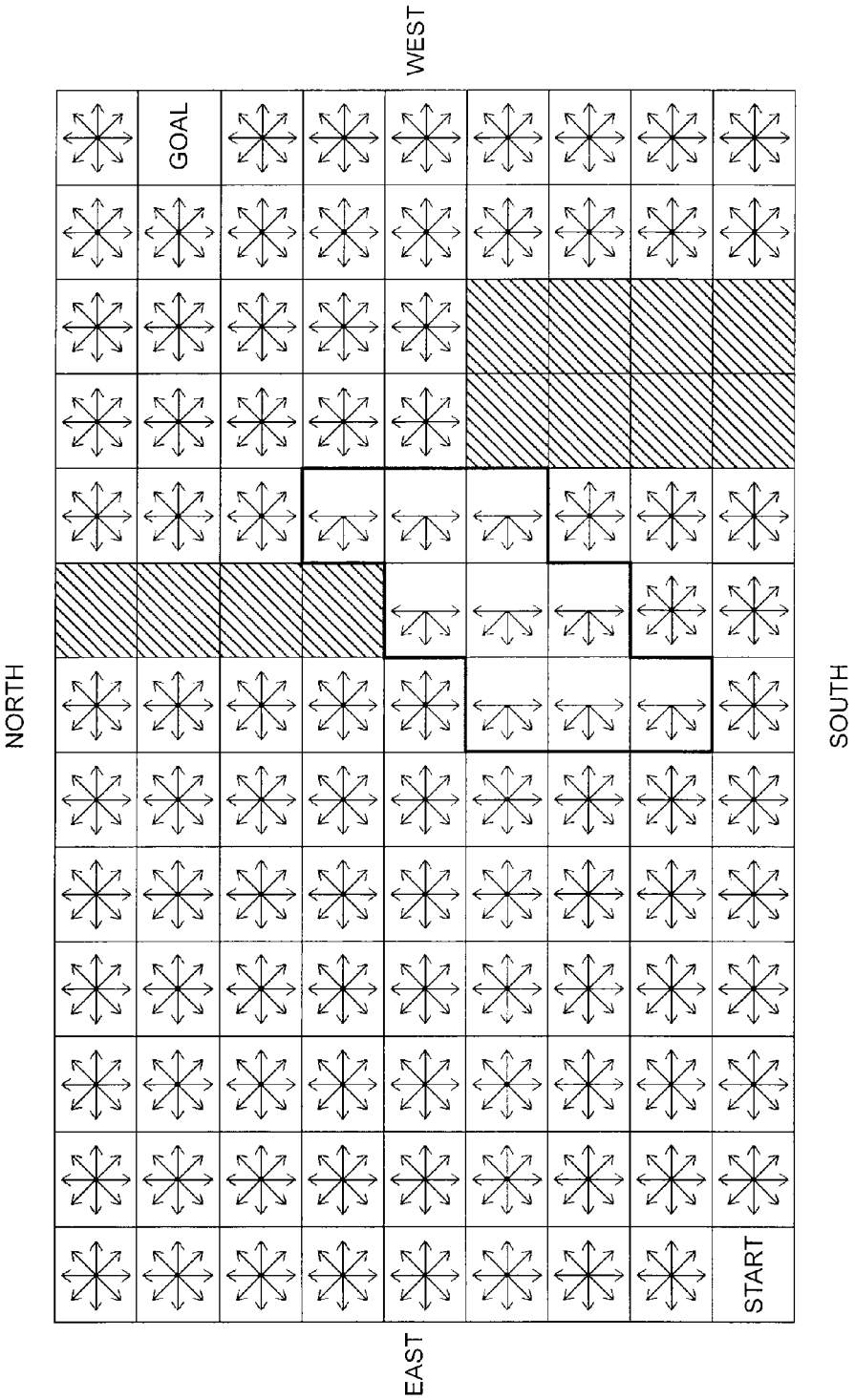
FIG. 14 shows map data on the daytime service environment according to the embodiment of the invention.

A daytime service environment is depicted in FIG. 13. In addition to the aforementioned fluorescent light, the sun can be mentioned as the external light source present in the daytime service environment. The infrared rays emitted from the sun are strong. When the front face of the service robot 1 is exposed to the infrared rays emitted from the sun, the operation of the distance measurement unit 20 is adversely affected. Accordingly, as shown in FIG. 14, part of the moving direction of the robot body 2 is locally limited around a region that is irradiated with sunlight. Specifically, as described above, if there is a moving direction of the robot body 2 in which a predetermined amount or more of the infrared rays emitted from the sun are radiated onto the front face 2a of the robot body 2 from ahead of the robot body 2 for each of the cells, the moving direction in each of the cells is limited. In other words, the moving direction of the service robot 1 that substantially coincides with the opposite direction of the propagation direction of the infrared rays emitted from the sun is limited for each of the cells. In the example of FIG. 14, the service robot 1 is prevented from moving southwest, west or northwest in a plurality of cells surrounded by a thick frame.

The moving path information generation unit 12 generates moving path information on the moving path of the robot body 2, based on the moving direction limit information. More specifically, the moving path information generation unit 12 generates moving path information based on current position information on the service robot 1, destination information on the service robot 1, map information, and moving direction limit information. The moving path information generation unit 12 generates moving path information through the use of a search algorithm, for example, a grid shortest path plan, A* or the like.

The moving path information storage unit 13 stores the moving path information generated by the moving path information generation unit 12.

The distance information acquisition unit 14 acquires the forward distance information from the distance measurement unit 20.

The movement control unit 15 controls the movement of the service robot 1 by driving the four wheels 5 based on the moving path information stored in the moving path information storage unit 13, and the forward distance information.

The moving direction limit information update unit 16 constantly monitors an output value of the infrared sensor 21. When the output value of the infrared sensor 21 becomes equal to or larger than a predetermined value, the moving direction limit information update unit 16 updates the moving direction limit information in the moving direction limit information storage unit 10. Specifically, the moving direction limit information update unit 16 updates the moving direction limit information in such a manner as to limit the current moving direction of the service robot 1 in a cell corresponding to the current position of the service robot 1 at a time point when the output value of the infrared sensor 21 becomes equal to or larger than a predetermined value, in the moving direction limit information corresponding to the time point.

Figure 3:
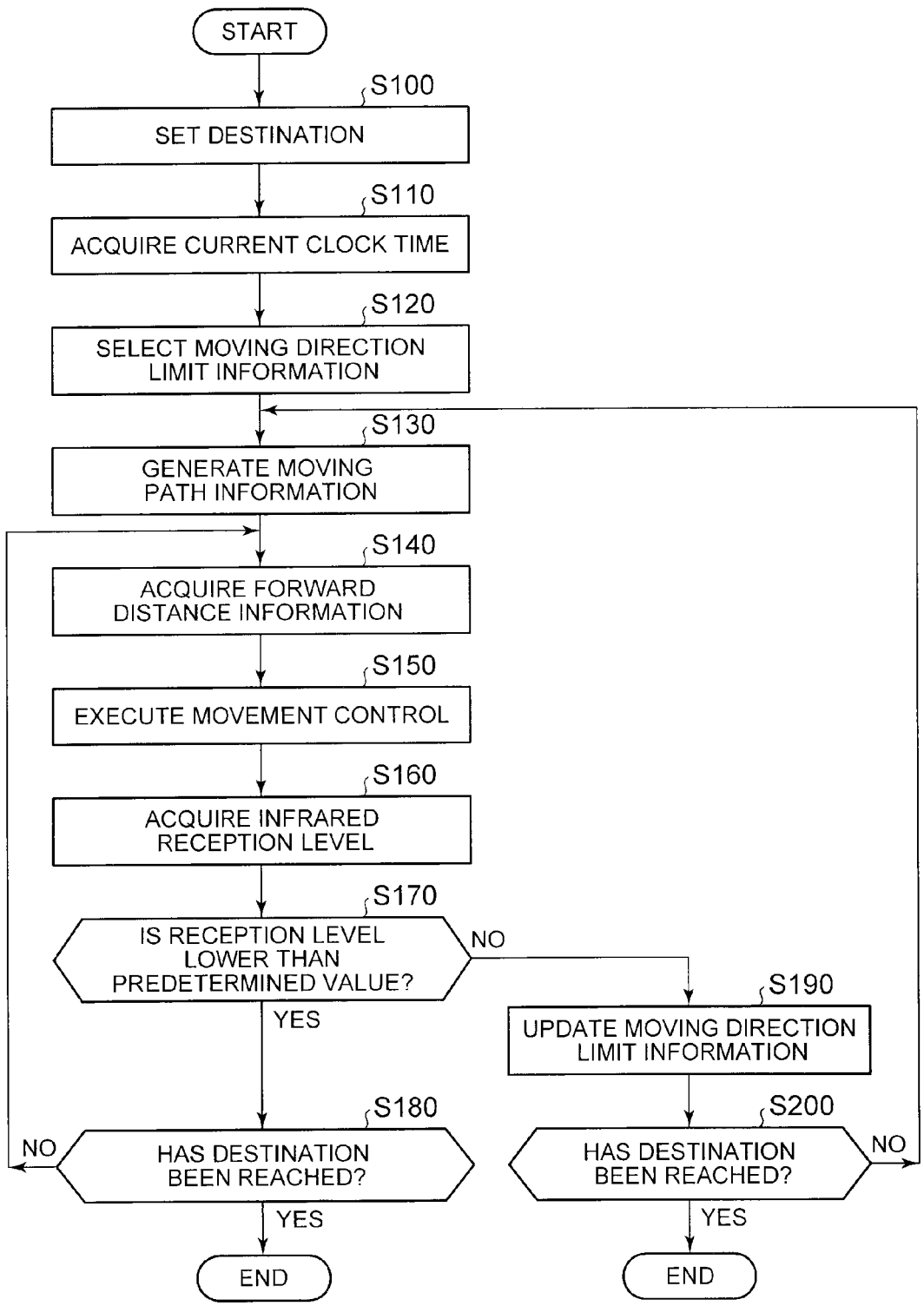
FIG. 3 is a control flowchart of the mobile object according to the embodiment of the invention.

Next, the control flow of the service robot 1 will be described with reference to FIG. 3.

First of all, a destination of the service robot 1 is set by being input from the outside (S100). The moving path information generation unit 12 acquires current clock time information (S110). Subsequently, the moving path information generation unit 12 selects moving direction limit information corresponding to the acquired current clock time information among the daytime limit information 10*a*, the early-evening limit information 10*b*, and the nighttime limit information 10*c*, and acquires the moving direction limit information (S120). Subsequently, the moving path information generation unit 12 generates moving path information based on the acquired moving direction limit information, current position information, destination information, and map information (S130), and stores the generated moving path information into the moving path information storage unit 13. Subsequently, the movement control unit 15 acquires forward distance information from the distance measurement unit 20 (S140). Subsequently, if it is determined based on the forward distance information that there is no obstacle ahead, the movement control unit 15 controls the movement of the service robot 1 based on the moving path information stored in the moving path information storage unit 13 (S150). Subsequently, the moving direction limit information update unit 16 acquires an output value of the infrared sensor 21 (an infrared reception level) (S160). The moving direction limit information update unit 16 determines whether or not the output value of the infrared sensor 21 is smaller than a predetermined value (S170). If the moving direction limit information update unit 16 determines that the output value of the infrared sensor 21 is smaller than the predetermined value (YES in S170), the control unit 3 determines whether or not the current position is a destination (S180). If it is determined that the current position is the destination (YES in S180), the control unit 3 ends the processing. On the other hand, if it is determined that the current position is not the destination (NO in S180), the control unit 3 returns the processing to S140. If it is determined in S170 that the output value of the infrared sensor 21 is not smaller than the predetermined value (NO in S170), the moving direction limit information update unit 16 updates the moving direction limit information (S190). Then, the control unit 3 determines whether or not the current position is the destination (S200). If it is determined that the current position is the destination (YES in S200), the control unit 3 ends the processing. On the other hand, if it is determined that the current position is not the destination (NO in S200), the control unit 3 returns the processing to S130.

Figure 6:
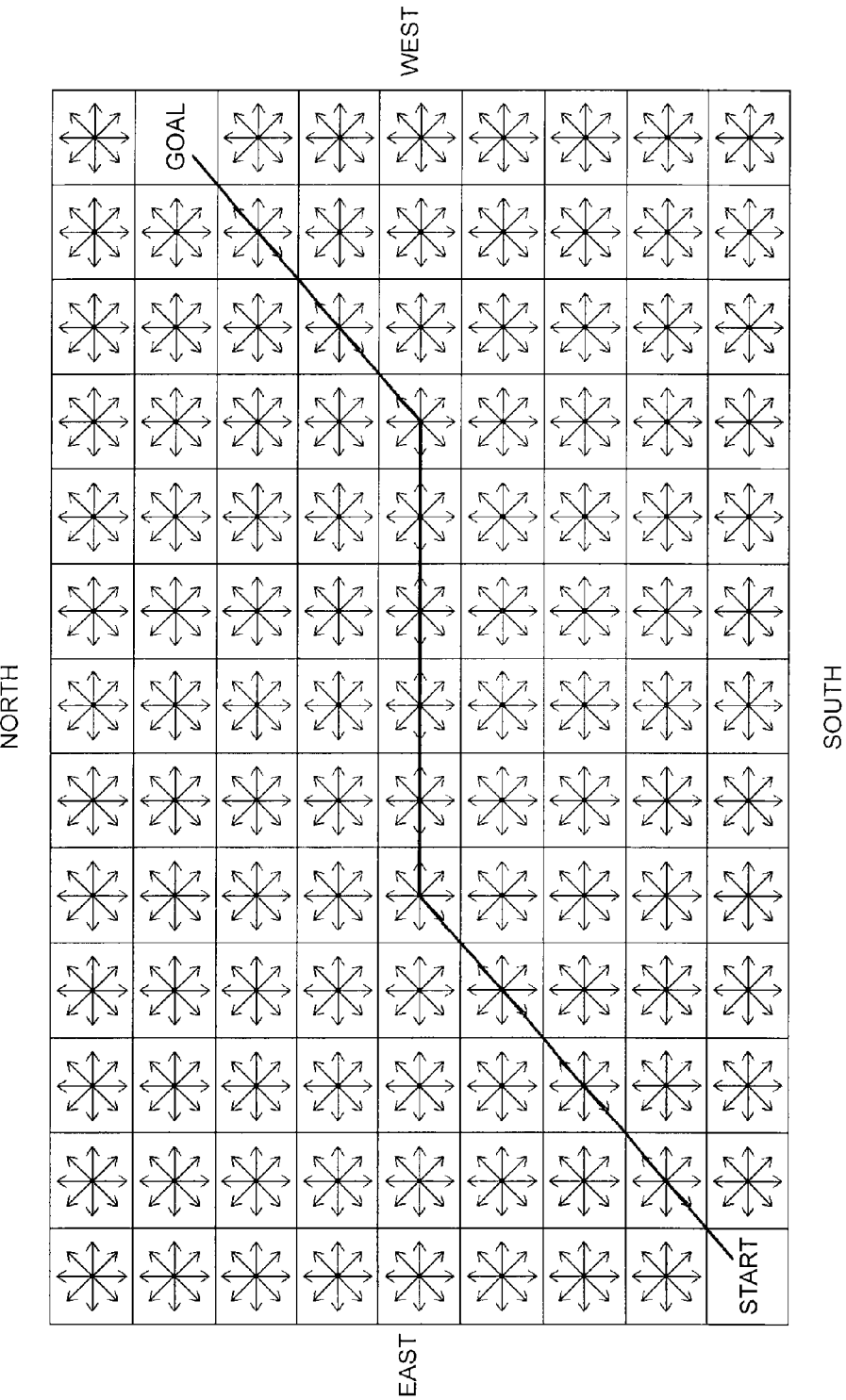
FIG. 6 shows map data on the nighttime service environment according to the embodiment of the invention, with a thick line representing a moving path.

In the example of FIG. 4, there is no obstacle from the current position of the service robot 1 to the destination, and there is no sunlight from the window 23 either because it is nighttime. Accordingly, as shown in FIG. 5, the moving direction of the service robot 1 is not limited at all. As shown in FIG. 6, the moving path of the service robot 1 is set to the shortest.

Figure 9:
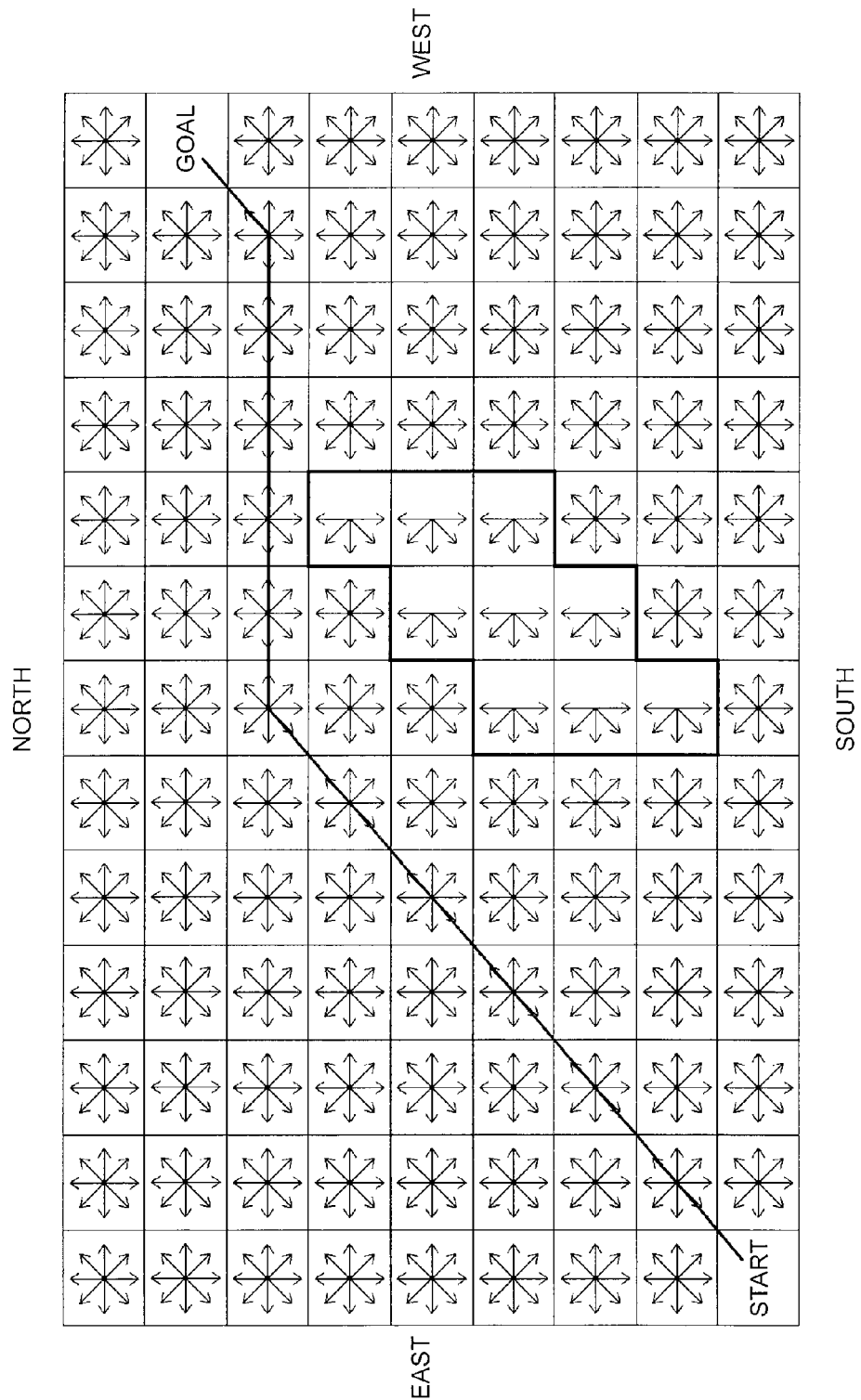
FIG. 9 shows map data on the daytime service environment according to the embodiment of the invention, with a thick line representing a moving path.

In the example of FIG. 7, there is no obstacle from the current position of the service robot 1 to the destination. However, there is sunlight from the window 23 because it is daytime. Accordingly, as shown in FIG. 8, the moving direction of the service robot 1 is locally limited to specific moving directions. As shown in FIG. 9, the moving path of the service robot 1 is set in such a manner as to bypass a region where the moving direction of the service robot 1 is limited.

Figure 12:
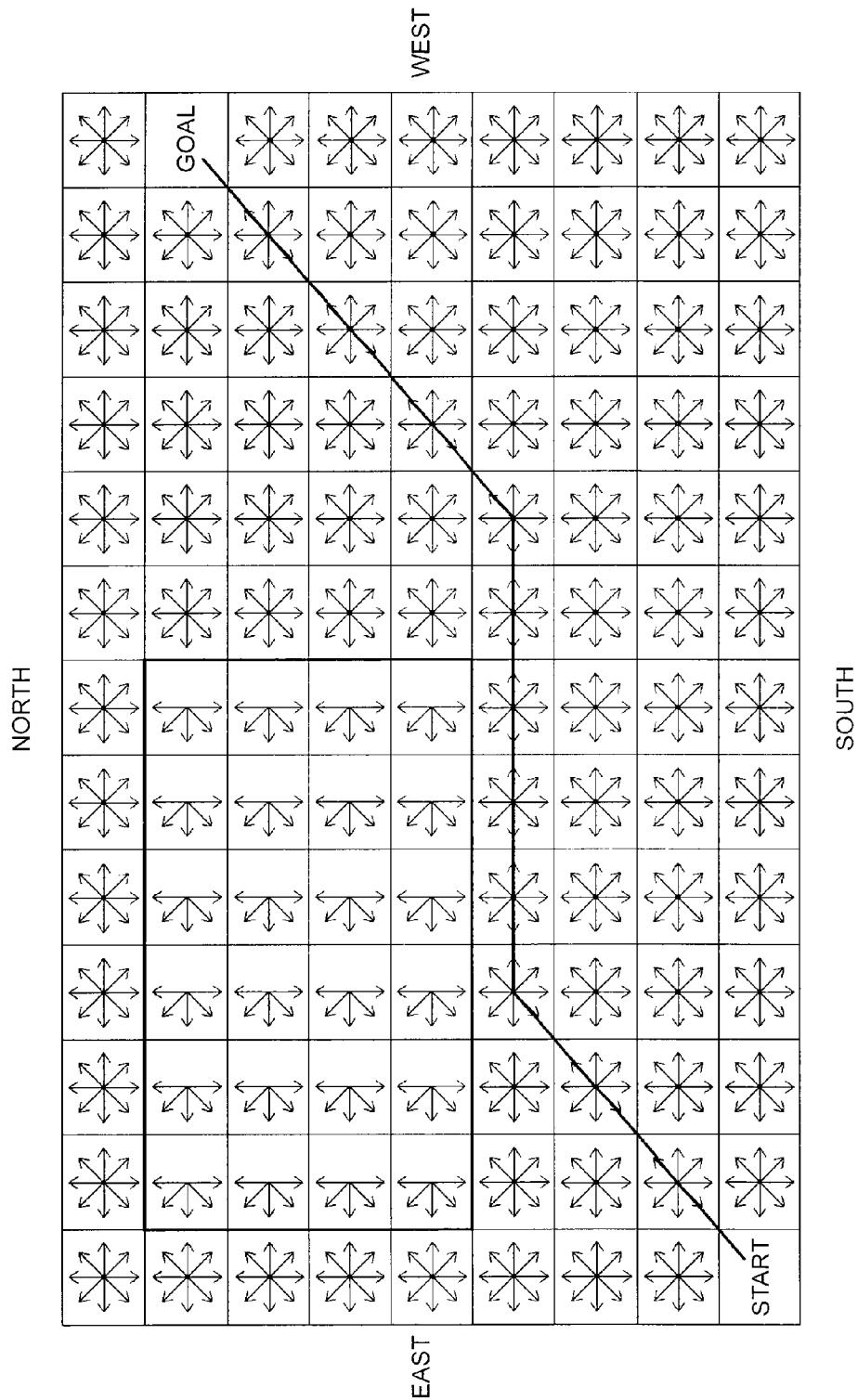
FIG. 12 shows map data on the early-evening service environment according to the embodiment of the invention, with a thick line representing a moving path.

In the example of FIG. 10, there is no obstacle from the current position of the service robot 1 to the destination. However, there is sunlight from the window 23 because it is early evening. Accordingly, as shown in FIG. 11, the moving direction of the service robot 1 is locally limited to specific moving directions. As shown in FIG. 12, the moving path of the service robot 1 is set in such a manner as to bypass a region where the moving direction of the service robot 1 is limited.

Figure 15:
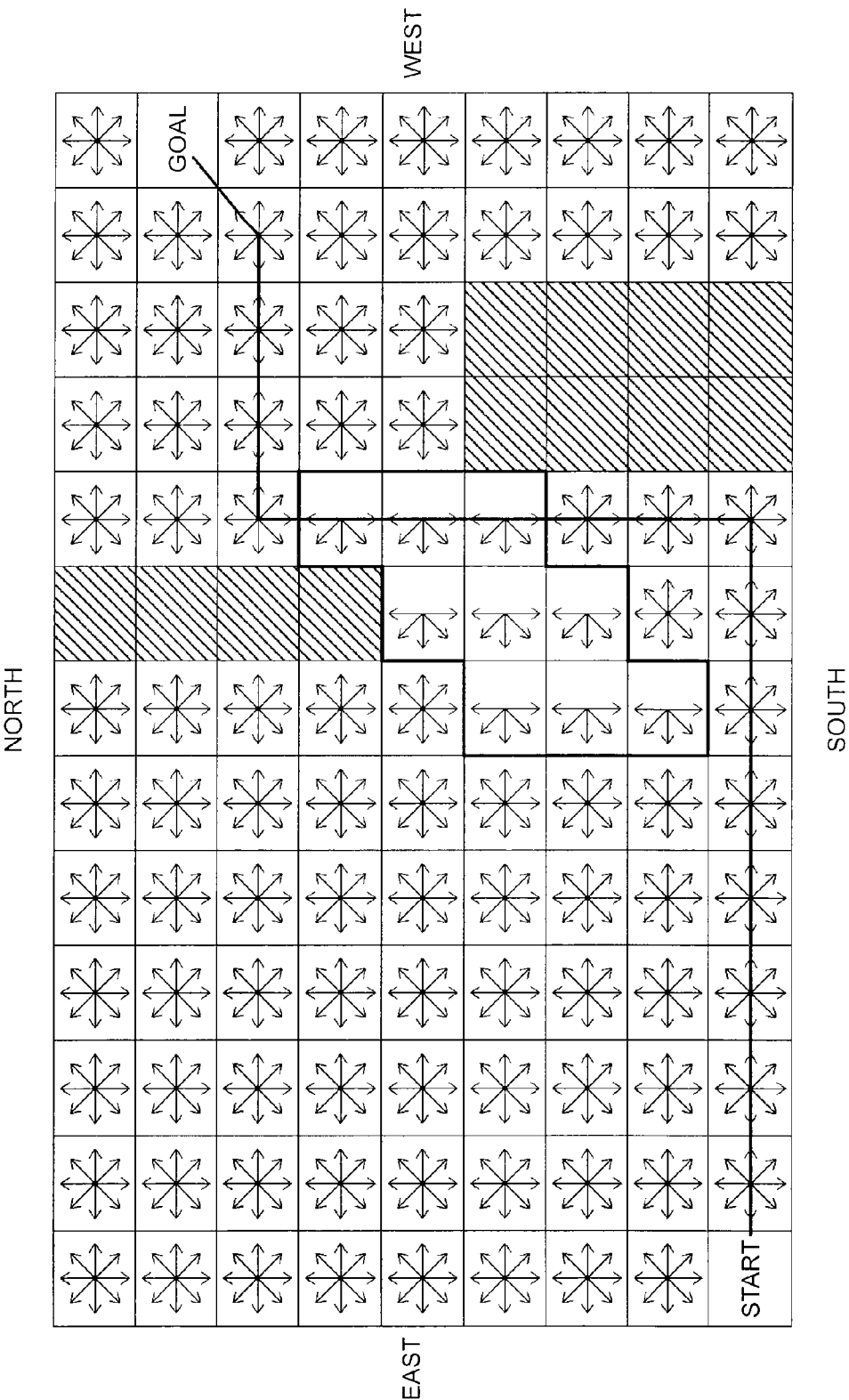
FIG. 15 shows map data on the daytime service environment according to the embodiment of the invention, with a thick line representing a moving path.

In the example of FIG. 13, there are two obstacles P from the current position of the service robot 1 to the destination. Besides, there is sunlight from the window 23 because it is daytime. Accordingly, as shown in FIG. 14, there are hatched regions that cannot be entered by the service robot 1. Besides, the moving direction of the service robot 1 is locally limited to specific moving directions. In the example of FIG. 14, the service robot 1 has no choice but to move past the region where the moving direction of the service robot 1 is limited, from the current position to the destination. In this case, as shown in FIG. 15, the moving path of the service robot 1 is set utilizing moving directions other than the limited moving directions, namely, permitted moving directions, in the region where the moving direction of the service robot 1 is limited.

The aforementioned embodiment of the invention has the following features.

The service robot 1 is equipped with the robot body 2 (the mobile object body), the distance measurement unit 20 (the distance measurement means) that is provided in the robot body 2 to measure the distance between the robot body 2 and the object present in front of the robot body 2 through the use of infrared rays, the movement control unit 15 (the movement control means) that controls the movement of the robot body 2 based on a measurement result obtained by the distance measurement unit 20 and moving path information on the moving path of the robot body 2, the moving direction limit information storage unit 10 (the moving direction limit information storage means) that stores moving direction limit information as information on limiting the moving direction of the robot body 2, and the moving path information generation unit 12 (the moving path information generation means) that generates moving path information based on the moving direction limit information. The moving direction limit information is information on limiting the moving direction of the robot body 2 in which a predetermined amount or more of the infrared rays emitted from an external light source, for example, the sun or the like are radiated onto the robot body 2 from ahead of the robot body 2. According to the foregoing configuration, the service robot 1 can reach its destination without any problem even under an environment where infrared rays from the external light source are radiated.

The moving direction limit information is information on limiting the moving direction of the robot body 2 that coincides with at least the opposite direction of the propagation direction of the infrared rays emitted from the external light source.

The moving direction limit information storage unit 10 stores the daytime limit information 10a, the early-evening limit information 10b, and the nighttime limit information 10c as a plurality of pieces of moving direction limit information that differ depending on the clock time. The moving path information generation unit 12 selects the moving direction limit information corresponding to the current clock time from the plurality of the pieces of moving direction limit information, and generates moving path information based on the selected moving direction limit information. According to the foregoing configuration, the service robot 1 can reach its destination without any problem even in the case where the propagation direction of the infrared rays emitted from the external light source changes with time.

The control of the service robot 1 (the mobile object) that moves while measuring the distance between the robot body 2 and the object present in front of the robot body 2 through the use of infrared rays is executed according to a method that includes a moving path information generation step (S130) for generating moving path information on the moving path of the service robot 1 based on moving direction limit information as information on limiting the moving direction of the service robot 1, and a movement control step (S150) for controlling the movement of the service robot 1 based on the moving path information and a measurement result of the distance. The moving direction limit information is information on limiting the moving direction of the service robot 1 in which a predetermined amount or more of the infrared rays emitted from the external light source are radiated from ahead of the robot body 2.

The moving direction limit information is information on limiting the moving direction of the service robot 1 that coincides with at least the opposite direction of the propagation direction of the infrared rays emitted from the external light source.

In the moving path information generation step (S130), moving direction limit information corresponding to the current clock time is selected from a plurality of pieces of moving direction limit information that differ depending on the clock time, and moving path information is generated based on the selected moving direction limit information.

What is claimed is:

1. A mobile object control system comprising:
   a mobile object body;
   a distance measurement unit that is provided in the mobile object body to measure a distance between the mobile object body and an object present in front of the mobile object body, through a use of infrared rays;
   a movement control unit configured to control movement of the mobile object body based on a measurement result obtained by the distance measurement unit and moving path information on a moving path of the mobile object body;
   a moving direction limit information storage unit configured to store moving direction limit information as information on limiting a moving direction of the mobile object body; and
   a moving path information generation unit configured to generate the moving path information based on the moving direction limit information, wherein
   the moving direction limit information is information on limiting the moving direction of the mobile object body in which a predetermined amount or more of infrared rays emitted from an external light source are radiated onto the mobile object body from ahead of the mobile object body, and
   when, in moving from a current position to a destination, the mobile object has no choice, due to an obstacle, but to move past a region where the moving direction of the mobile object body is limited, the moving path information generation unit generates the moving path information so as to include a moving direction in the region other than a limited moving direction of the region.

2. The mobile object control system according to claim 1, wherein
   the moving direction limit information is information on limiting the moving direction of the mobile object body that coincides with at least an opposite direction of a propagation direction of the infrared rays emitted from the external light source.

3. The mobile object control system according to claim 2, wherein
   the moving direction limit information storage unit stores a plurality of pieces of moving direction limit information that differs depending on a clock time, and
   the moving path information generation unit selects the moving direction limit information corresponding to a current clock time from the plurality of the pieces of moving direction limit information, and generates the moving path information based on the selected moving direction limit information.

4. A control method for a mobile object that moves while measuring a distance between a mobile object body and an object present in front of the mobile object body through a use of infrared rays, comprising:
   generating moving path information on a moving path of the mobile object based on moving direction limit information as information on limiting a moving direction of the mobile object; and
   controlling movement of the mobile object based on the moving path information and a measurement result of the distance, wherein
   the moving direction limit information is information on limiting the moving direction of the mobile object in which a predetermined amount or more of infrared rays emitted from an external light source are radiated from ahead of the mobile object body, and
   when, in moving from a current position to a destination, the mobile object has no choice, due to an obstacle, but to move past a region where the moving direction of the mobile object body is limited, generating includes generating the moving path information so as to include a moving direction in the region other than a limited moving direction of the region.

5. The control method according to claim 4, wherein
   the moving direction limit information is information on limiting the moving direction of the mobile object that coincides with at least an opposite direction of a propagation direction of the infrared rays emitted from the external light source.

6. The control method according to claim 5, wherein
   generating the moving path information includes selecting the moving direction limit information corresponding to a current clock time from a plurality of pieces of moving direction limit information that differs depending on a clock time, and generating the moving path information based on the selected moving direction limit information.

7. A non-transitory recording medium storing mobile object control instructions which, when executed, cause a computer to perform a control method for a mobile object that moves while measuring a distance between a mobile object body and an object present in front of the mobile object body through a use of infrared rays, the method comprising:
 generating moving path information on a moving path of the mobile object based on moving direction limit information as information on limiting a moving direction of the mobile object; and
 controlling movement of the mobile object based on the moving path information and a measurement result of the distance, wherein
 the moving direction limit information is information on limiting the moving direction of the mobile object in which a predetermined amount or more of infrared rays emitted from an external light source are radiated from ahead of the mobile object body, and
 when, in moving from a current position to a destination, the mobile object has no choice, due to an obstacle, but to move past a region where the moving direction of the mobile object body is limited, generating includes generating the moving path information so as to include a moving direction in the region other than a limited moving direction of the region.

\* \* \* \* \*